United States Patent
Sauar

[15] 3,663,366
[45] May 16, 1972

[54] SHROUD FOR A FUEL ASSEMBLY IN A NUCLEAR REACTOR

[72] Inventor: Tor Ole Sauar, Stabekk, Norway

[73] Assignee: Institutt for Atomenergi, Kjeller, Norway

[22] Filed: Apr. 3, 1969

[21] Appl. No.: 813,296

[30] Foreign Application Priority Data

Apr. 6, 1968 Norway ................................ 1351/68

[52] U.S. Cl. ............................ 176/68, 176/87, 176/93 BP
[51] Int. Cl. .................................... G21c 3/30, G21c 3/38
[58] Field of Search .......................... 176/93 BP, 68, 87

[56] References Cited

UNITED STATES PATENTS

| 3,049,484 | 8/1962 | Zinn ................................. 204/193.2 |
| 3,175,955 | 3/1965 | Cheverton ............................. 176/68 |

FOREIGN PATENTS OR APPLICATIONS

| 966,366 | 8/1964 | United Kingdom ..................... 176/93 |
| 913,655 | 12/1962 | United Kingdom ..................... 176/93 |
| 1,176,766 | 8/1964 | Germany ............................. 176/93 |

OTHER PUBLICATIONS

Nuclear Science & Eng.; " Borax Power Plant," Oct. 1956, page 435

Primary Examiner—Carl D. Quarforth
Assistant Examiner—Gary G. Solyst
Attorney—Watson, Cole, Grindle & Watson

[57] ABSTRACT

In nuclear reactors utilizing water both as moderator and coolant, shrouds are frequency applied for the direction and confinement of the coolant flow along the fuel element.

In a reactor according to the invention, however, said shrouds also serve another purpose, namely to provide the reactor core with burnable poison, which will advantageously modify the operation of the reactor in several ways.

According to the invention it is considered convenient to disperse said burnable poison in sheets of stainless steel, which form an internal layer of a zirconium alloy. Said shroud will then be constructed from such compound plates.

1 Claim, No Drawings

SHROUD FOR A FUEL ASSEMBLY IN A NUCLEAR REACTOR

The present invention relates to a shroud of zirconium or a zirconium alloy for a fuel assembly in a nuclear reactor and a method for fabrication of such a shroud. In nuclear reactors using water both as moderator and coolant, fuel elements in the form of clusters are widely used. These clusters are surrounded by and connected to a shroud which is provided at the top and the bottom with openings to the liquid in the reactor tank. When the reactor is operating, the coolant will flow into the shroud through the lower opening, pass between the rods in the cluster while being heated and leave the shroud through the upper opening.

A fuel assembly of this type is described in the "Second Annual Report of the OEEC Halden Boiling Heavy Water Reacter Project," published by the Organization of European Economic Co-operation in Apr. 1961 (page 88–92).

The shroud must not necessarily be mechanically connected with the fuel element. In this patent application the word shroud is thus meant to define a tube surrounding a fuel element and forming the external limitation for the coolant flow along the fuel element.

The shroud according to the invention is characterized in that it contains a burnable poison, preferably boron enriched in the isotope $B^{10}$. According to the invention it is convenient to disperse the burnable poison in sheets of stainless steel which form an internal layer in a compound plate of zirconium or a zirconium alloy. The shroud is then made from one or more compound plates. The content of burnable poison in the different parts of the compound plates may possibly be made ununiform by using sheets of stainless steel of different thicknesses in the compound plates and by using sheets of stainless steel which have a substantially lesser dimension than the external layers in at least one direction.

A method for fabrication of a shroud according to the invention is characterized in that a material enriched in $B^{10}$ is added to a quantity of stainless steel and then rolled to form sheets. One or more of the sheets are placed between plates of zirconium or a zirconium alloy and united to form a compound plate. The compound plates may be shaped, and the shroud is made from one or more of these plates.

It is previously known to use a burnable poison in a nuclear reactor. Usually rare-earth elements as gadolinium, dysprosium and erbium have been applied for this purpose. These elements contain at least one isotope having a very large capture cross-section for thermal neutrons. By neutron capture the isotope concerned is transformed to another isotope which must have a small capture cross-section.

The application of a burnable poison in a nuclear reactor has the advantage that the initial fuel enrichment can be high in comparison with nuclear reactors not using a burnable poison. This fact implies longer time intervals between two refuellings as the reactivity which is necessary for the operation of the reactor will be maintained for a longer time. Further, a better power distribution can be achieved by variation of the poison distribution in the core. It is also advantageous that the use of a burnable poison will result in less use of the control rods. In the past the burnable poison has usually been added to the fuel material, but it is also known to add the poison to the canning material.

It is a disadvantage, however, that both these two methods will give an uneven local flux distribution and uneven burn-up in the different fuel rods. Further, owing to the risk of shortened life-time for the fuel elements, none of these methods have so far been adopted in commercial power reactors. For that reason extensive tests and long duration irradiations in nuclear reactors will be necessary.

By using shrouds according to the invention this disadvantage is avoided. Particularly it is possible to reduce flux peaking in the space between the fuel elements. An additional advantage by the disposition of the burnable poison in the shroud is simplified reprocessing of the fuel material. Usually the irradiated fuel elements are dismantled before reprocessing. The external structure and the shroud are subjected to a separate treatment, whereas the fuel rods are decanned by chemical or mechanical means and thereafter dissolved in nitric acid. When the burnable poison is kept separate from the fuel material, the poison will not interfere with the purification process.

Shrouds according to the invention may be applied with advantage in all nuclear reactor types which employ the same liquid both as coolant and moderator, for example light water reactors, heavy water reactors and organic moderated and cooled reactors. In reactors of this kind the shroud is preferentially mechanically connected to the fuel element and they will be inserted in and removed from the reactor as a unit.

In nuclear reactors having a moderator separated from the coolant, partition walls in the form of pressure pipes are usually applied whether the moderator and coolant have the same composition or not. The shroud according to the invention may in that case consist of the pressure tube. This will, however, necessitate the simultaneous removal of the pressure tube and the fuel element if the favorable effect of the burnable poison is to be retained during the life-time of the reactor. The shroud may alternatively be designed as a loose lining in the pressure tube.

According to the invention boron is used as burnable poison. The burn-up characteristic of boron is suitable in connection with the small self-shielding effect that results from the use of boron in thin plates. On the other side the use of boron has a disadvantage as it as an admixture to zirconium and zirconium alloys will give a brittle material having a poor workability. In up-to-date nuclear reactors Zircaloy 2 (containing 1.20 – 1.70% Sn, 0.07 – 0.20% Fe, 0.05 – 0.15% Cr, 0.03 – 0.08% Ni, total 0.18 – 0.38% Fe + Cr + Ni, 0.09 – 0.16% O and the remainder Zr) and Zircaloy 4 (containing 1.20 – 1.70% Sn, 0.18 – 0.24% Fe, 0.07 – 0.13% Cr, total 0.28 – 0.37% Fe + Cr, 0.09 – 0.16% O and the remainder Zr) are employed as canning material and to the greatest possible extent as structural material in the reactor core.

According to the invention boron may be used as burnable poison in plates made of zirconium or a zirconium alloy by the admixture of boron in stainless steel followed by a rolling operation to form thin sheets. The thermal coefficient of expansion of the zirconium and steel materials should be of the same order.

In order to reduce the amount of stainless steel in the core and to be able to place the steel sheets in the shroud wall, the sheets have to be very thin. The actual thickness of the stainless steel sheets and their position in the plates in a shroud will be determined by the desired influence on reactivity, in other words the desired flux distribution in the reactor.

The shrouds are made by placing the sheets between two zirconium or zirconium alloy plates and welding the edges together. In order to avoid distortion, electron beam welding should be used. If the sheets have a significantly smaller extension than the plates, they must be fixed in their proper position by spotwelding of the plates around the sheets. If the plates were welded together in the usual way, it might be necessary to straighten the plates by a rolling operation after the welding.

The invention will now be described by an example:

Burnable poison in the form of boron, 92 percent enriched in the isotope $B^{10}$, is used. Boron is added to stainless steel of the AISI 304 type in an amount to make the final alloy contain 1.5 w/o boron.

The stainless steel AISI 304 contains 18 – 20 percent Cr, 8 – 12 percent Ni and a maximum of 2.0 percent Mn, 1 percent Si, 0.08 percent C, 0.045 percent P and 0.030 percent S. The boron steel is rolled to form sheets in thicknesses of 0.12 and 0.31 mm. The sheets are placed between Zircaloy 4 plates with a thickness of 0.35 mm. The proper position of the sheets is fixed by spotwelding of the plates around the sheets after which the plates are welded together by an electron beam. The compound plates are shaped to form a quadratic shroud which surrounds a cluster containing 8 × 8 fuel rods. This is performed by making angle plates which are welded together to form a quadratic box. Each of the compound plates will then constitute one quarter of the complete box.

Extensive calculations have been performed for a boiling light water reactor with shrouds according to the invention. The core consists of 61 fuel elements with 8 × 8 fuel rods in each element. The active length of the rods is 160 cm. The elements are disposed next to each other, a shroud on every other element forming a system of channels for the coolant within a mantle surrounding the entire core. The shrouds are constructed of three types of plates having the following boron steel distribution:

| Distance from the top of active fuel, cm | I | Type II | III |
|---|---|---|---|
| | Boron steel thickness, mm | | |
| 0 – 12,5 | — | — | — |
| 12,5 – 39,5 | 0,12 | 0,12 | — |
| 39,5 – 147,5 | 0,31 | 0,12 | — |
| 147,5 – 160,0 | — | — | — |

These plates will form regions in the core with different amounts of burnable poison. In the interior region, containing 32 fuels elements, 64 type I plates are used. In the exterior region the shrouds are built up of 32 type II plates while the remaining plates, nearest to the reflector, are of type III.

The calculations demonstrate that the boron will burn together with the fuel so that the reactivity of the system can be kept constant over a period of three-fourths of the core lifetime. The system will in addition provide the desired overall power distribution in the core, giving an internal form factor in the fuel element in the order of 1.1 and 1.27 for shrouds containing steel sheets of thicknesses 0.12 mm and 0.31 mm respectively. These form factors are valid for an enrichment of approximately 3 percent. At a burn-up of 19.200 MWd/tU the reactivity consumed by the boron steel has dropped from 20 percent to below 1.5 percent. The reactivity consumed by the steel is then only 0.4 percent. The present arrangement for the smoothening of reactivity in a nuclear reactor has thus been found very efficient.

I claim:

1. Shroud for a fuel assembly for a nuclear reactor, said shroud encompassing at least one fuel member and having openings in its lower and upper parts, so that a coolant can flow through the space defined by the shroud along said fuel member and remove heat generated by nuclear fission in said member, said shroud comprising a plurality of stainless steel sheets, each containing boron enriched in boron $B^{10}$, said sheets being disposed between a pair of zirconium-containing external plates, each said sheets being of such a thickness that no appreciable self-shielding of the incorporated amount of boron is present when exposing said sheets to thermal neutron radiation, said sheets being spot welded along their edges to said external plates, and wherein the content of enriched boron of the shroud is made non-uniform by using said plurality of said sheets of stainless steel, each of which have different thicknesses and each with a substantially lesser dimension than said external plates in at least one direction.

* * * * *